Feb. 26, 1957 J. H. BOICEY 2,783,176
METHOD OF LAMINATING PLASTIC MATERIALS
Filed Aug. 24, 1954

INVENTOR.
James H. Boicey
BY Nobbe & Swope
ATTORNEYS

United States Patent Office 2,783,176
Patented Feb. 26, 1957

2,783,176

METHOD OF LAMINATING PLASTIC MATERIALS

James H. Boicey, Toledo, Ohio, assignor to Libbey-Owens-Ford Glass Company, Toledo, Ohio, a corporation of Ohio Application August 24, 1954, Serial No. 451,877

9 Claims. (Cl. 154—139)

The present invention relates to a method of laminating plastic materials and more particularly to a method of laminating these materials with a minimum of heat and pressure.

A number of methods have been used in which sheets of acrylic resin have been laminated with sheets of polyvinyl butyral resin with the pressure obtained by evacuating air from a bag enclosing these materials. These prior methods have not been entirely satisfactory since they resulted in a wrinkled sheet material so that when optically flat sheets were desired, higher pressures were considered necessary. Accordingly, in the methods of the prior art it was customary to autoclave the assembly at a temperature of about 275° F. under a pressure of the order of 200 p. s. i. to produce flat sheets.

It is an object of this invention to produce laminated sheets of thermoplastic material by a process utilizing atmospheric pressure.

Another object of this invention is to provide an improved method of laminating acrylic resins with polyvinyl butyral.

A further object of this invention is to provide a simple method of removing any wrinkles formed when acrylic resin and polyvinyl butyral are laminated using a vacuum.

It has now been found that these and other objects may be accomplished by placing the assembled acrylic sheets and polyvinyl butyral interlayer sandwich in a bag, exhausting the air from the bag and putting it in an open hot water bath for a period of time, removing the laminated unit from the bag, and hanging it in an oven kept at elevated temperatures to remove wrinkles. By thus removing the wrinkles, high pressure autoclaving has been avoided. This method of removing wrinkles also provides an optically flat laminated sheet of plastic material.

In the drawings in which like numerals are employed to designate like parts throughout the same:

Figure 1:
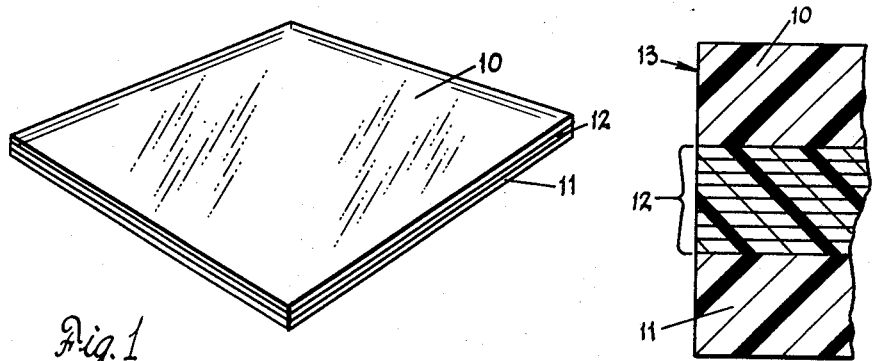
Fig. 1 is a perspective view of the plastic sheets formed into a sandwich.
Figure 2:
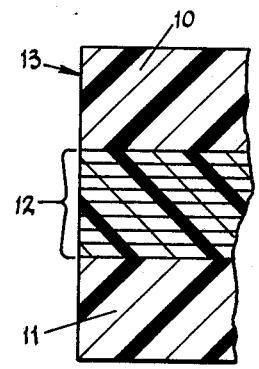
Fig. 2 is a partial sectional view of the sandwich of Fig. 1.
Figure 3:
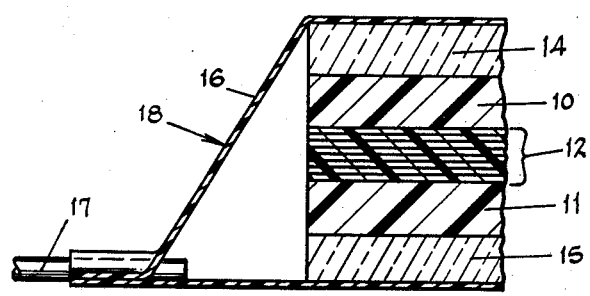
Fig. 3 is a partial sectional view of the sandwich in a later stage of the laminating process.
Figure 4:
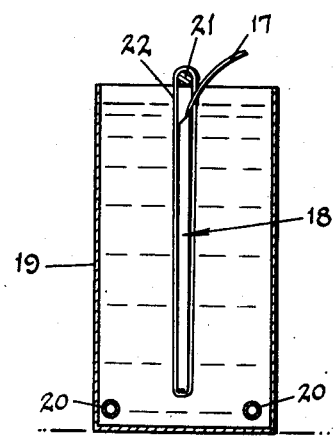
Fig. 4 illustrates a still later step in the process wherein the plastic sandwich is being laminated into a single unit.
Figure 5:
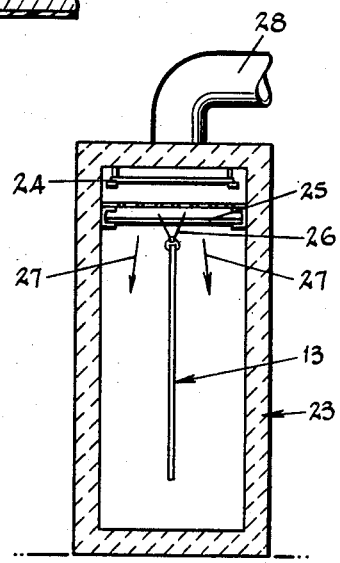
Fig. 5 is a view illustrating a still later step in the process of this invention wherein the wrinkles are being removed from the laminated article.

Referring now to the drawings, Figs. 1 and 2 show two sheets of acrylic resin 10 and 11 and a plurality of sheets of polyvinyl butyral 12 formed into a sandwich 13. The sandwich 13 is placed between two sheets of glass 14 and 15 and the resulting unit is placed in a plastic bag 16 as shown in Fig. 3. The plastic bag 16 is sealed by securing the edges of its mouth together by an adhesive or any other means that will provide an air-tight seal. A tube 17 is sealed between the sides of the mouth of the bag so that it communicates to the space within the bag 16. Air is extracted through the tube 17 to provide a vacuum of about 28 to 29 inches of mercury within the plastic bag. The evacuated unit is generally designated by the numeral 18. This unit is kept at room temperature for about 30 minutes to remove all of the air from between the sheets.

The evacuated unit 18 is suspended in hot water which is held within a container 19. The water is kept hot by means of a steam coil 20 positioned near the bottom of the container 19. The unit 18 is then suspended on rack 21 by means of a wire 22 or any other suitable fastening device. The water is maintained at about 210° F. and the unit is retained therein for approximately one hour. After this treatment, the laminated sandwich is removed from the plastic bag 16. The sheets of glass 14 and 15 may now be used again in laminating another unit of thermoplastic material.

The laminated sandwich 13 is now suspended in an oven 23 which is heated by a heating element 24 that maintains the oven between 240 and 250° F. The unit 13 is hung from a rack 25 by a suitable fastening means 26 so that its own weight produces a longitudinal tension that removes all of the wrinkles from the unit during this heating treatment. The air within the oven 23 is carefully controlled as to humidity and circulated within the oven as indicated by the arrows 27; the control being effected through the air duct 28.

Figure 6:
Fig. 6 is a partial sectional view of a finished laminated article made by the process of this invention.

The final laminated unit 29 as shown in Fig. 6 is a flat sheet of transparent plastic material having all of the original sheets firmly adhered together. The plurality of polyvinyl butyral sheets 12 have now become a single sheet of polyvinyl butyral. If desired a single sheet of interlayer may be used, but a plurality of sheets are shown herein to illustrate the method of building up the plastic interlayer to any desired thickness.

The method is also applicable to units of more than three ply in which more than two sheets of acrylic material and more than one interlayer of polyvinyl butyral is used. For example, a five ply unit may be made having an outside sheet of acrylic resin, an interlayer of polyvinyl butyral fitting against the outside sheet, a middle sheet of acrylic resin fitting against said interlayer, another interlayer of polyvinyl butyral fitting against said middle sheet, and a final outer sheet of acrylic resin fitting against the last mentioned interlayer. All the surfaces of the acrylic material that are contacted with interlayer are preferably treated with an adhesive before the sandwich is assembled.

Before assembling the sandwich 13 an adhesive is sprayed upon the inner faces of the acrylic sheets 10 and 11 to produce better adhesion between the acrylic resin and the polyvinyl butyral interlayer. Any one of a number of adhesive materials known to those skilled in the art may be used, and such adhesives may be obtained from either Du Pont or Rohm & Haas who are makers of polymethyl methacrylate and who also supply adhesives therefor. Preferably the adhesive is applied by spraying from an atomizing spray gun. The adhesive is then allowed to dry before the acrylic sheets are assembled with the plastic interlayer. The polyvinyl butyral interlayer is washed, dried, and maintained in a dry state during the laminating process of this invention.

The plastic bag may be made from any plastic material that will produce an air-tight closure such as Du Pont's Neoprene, cellophane or the like. Cellophane bags are not usable for more than one laminating process, whereas Du Pont's Neoprene may be used a number of times.

The vacuum required should be sufficient to remove enough air from between the sheets to be adhered that no air bubbles will appear in the lamination. Generally, the vacuum should be above 25 inches of mercury, and preferably it should be within one inch of mercury of the barometric pressure. It is important to have the vacuum applied to the sandwich at ordinary temperatures for a time sufficient to remove all of the air from between the sheets of plastic material. The time required will vary with the size of the sheets to be laminated. The vacuum should also be maintained while the sandwich is immersed in the water bath to keep air from getting back between the sheets during the adhesion.

The water bath may be maintained at any temperature sufficient to produce the necessary adhesion. In order to cause adhesion between the acrylic and polyvinyl butyral sheets temperatures of above 150° F. are usually necessary. If temperatures higher than the boiling point of water are desired other liquid media may be used. The use of any liquid material that does not have adverse effects on the laminate is within the scope of this invention. The upper temperature of the liquid bath is determined by the temperature at which the laminate is injured when maintained for the time necessary for adhesion. With higher temperatures of the liquid bath, less time is required to cause the required adhesion. The time required is also dependent on the surface size and thickness of the sheets.

The temperature of the oven 23 may also vary over a wide range such as 240 to 350° F. The temperature must be high enough to remove the wrinkles but not high enough to cause it to deform. The wrinkles referred to herein are caused by the variation from flatness between the sheets of glass 14 and 15 and the outer acrylic sheets 10 and 11. These wrinkles are usually large in area but they are sufficient to prevent the unit from being optically flat. Mars such as deep scratches are not expected to be removed by the process of this invention.

The preferred acrylic resin is polymethyl methacrylate although it is contemplated that other acrylic resins may be used. The polyvinyl butyral of this invention is similar to the polyvinyl butyral now generally used for laminating glass.

It is to be understood that the form of the invention disclosed herein is to be taken as the preferred embodiment thereof, and that various changes may be resorted to without departing from the spirit of the invention or the scope of the following claims.

I claim:

1. A method of laminating thermoplastic sheet material comprising forming a sandwich having two outer sheets of acrylic plastic and at least one sheet of polyvinyl butyral plastic, enclosing the sandwich in a plastic bag, evacuating the air from the bag, putting the evacuated bag and contents in a hot liquid bath to form a laminated unit, removing the laminated unit from the bag, and hanging the said laminated unit in an oven heated to an elevated temperature to remove wrinkles.

2. A method of laminating thermoplastic sheet material comprising forming a sandwich having two outer sheets of acrylic plastic and at least one sheet of polyvinyl butyral plastic, placing a sheet of glass on each side of said sandwich to form an assembly, enclosing the assembly in a plastic bag, evacuating the air from the bag, putting the bag and contents in a hot liquid bath to form a laminated unit, removing the laminated unit from the bag, and hanging the said laminated unit in an oven heated to a temperature of 240 to 350° F. to remove wrinkles.

3. A method of laminating thermoplastic sheet material comprising forming a sandwich having two outer sheets of polymethyl methacrylate plastic and at least one sheet of polyvinyl butyral plastic, placing a sheet of glass on each side of said sandwich to form an assembly, enclosing the assembly in a plastic bag, evacuating the air from the bag, retaining the evacuated bag at room temperature for a time sufficient to remove the air from between plastic sheets, putting the bag and contents in a 210° F. water bath for about an hour to form a laminated unit, removing the laminated unit from the bag, and hanging the said laminated unit in an oven heated to a temperature of 240 to 250° F. to remove wrinkles.

4. A method of laminating thermoplastic sheet material comprising coating one side of each of two acrylic plastic sheets with an adhesive material, placing at least one sheet of polyvinyl butyral between said acrylic plastic sheets with the adhesive coatings of each sheet adjacent the polyvinyl butyral, enclosing the assembly in a plastic bag, evacuating the air from the bag, retaining the evacuated bag at room temperature for a time sufficient to remove the air from between plastic sheets, putting the bag and contents in a hot liquid bath to form a laminated unit, removing the laminated unit from the bag, and hanging the said laminated unit in an oven heated to an elevated temperature to remove wrinkles.

5. A method of laminating thermoplastic sheet material comprising coating one side of each of two acrylic plastic sheets with an adhesive material, placing at least one sheet of polyvinyl butyral between said acrylic plastic sheets with the adhesive coatings of each sheet adjacent the polyvinyl butyral, placing a sheet of glass on each side of said sandwich, enclosing the assembly in a plastic bag, evacuating the air from the bag, retaining the evacuated bag at room temperature for a time sufficient to remove the air from between plastic sheets, putting the bag and contents in a hot water bath to form a laminated unit, removing the laminated unit from the bag, and hanging the said laminated unit in an oven heated to a temperature of 240 to 350° F. to remove wrinkles.

6. A method of laminating thermoplastic sheet material comprising coating one side of each of two polymethyl methacrylate plastic sheets with an adhesive material, placing at least one sheet of polyvinyl butyral between said polymethyl methacrylate plastic sheets with the adhesive coatings of each sheet adjacent the polyvinyl butyral, placing a sheet of glass on each side of said sandwich, enclosing the assembly in a plastic bag, evacuating the air from the bag, retaining the evacuated bag at room temperature for a time sufficient to remove the air from between plastic sheets, putting the bag and contents in a hot water bath to form a laminated unit, removing the laminated unit from the bag, and hanging the said laminated unit in an oven heated to a temperature of 240 to 250° F. to remove wrinkles.

7. A method of laminating thermoplastic sheet material comprising coating one side of each of two polymethyl methacrylate plastic sheets with an adhesive material, placing sufficient sheets of polyvinyl butyral to make the desired thickness between said polymethyl methacrylate plastic sheets with the adhesive coatings of each sheet adjacent the polyvinyl butyral, placing a sheet of glass on each side of said sandwich, enclosing the assembly in a plastic bag, evacuating the air from the bag, retaining the evacuated bag at room temperature for a time sufficient to remove the air from between plastic sheets, putting the bag and contents in a hot water bath to form a laminated unit, removing the laminated unit from the bag, and hanging the said laminated unit in an oven heated to a temperature of 240 to 250° F. to remove wrinkles.

8. A method of laminating thermoplastic sheet material comprising making a sandwich having alternate layers of polyvinyl butyral and inner sheets of acrylic resin, enclosing the sandwich within two outer sheets of acrylic resin, placing a sheet of glass on each side of said outer sheets to form an assembly, enclosing the assembly in a plastic bag, evacuating the air from the bag, putting the bag and contents in a hot liquid bath to form a laminated unit, removing the laminated unit from the bag, and hanging the said laminated unit in an oven heated to an elevated temperature to remove wrinkles.

9. A method of laminating thermoplastic sheet material comprising making a sandwich having alternate layers of polyvinyl butyral and inner sheets of acrylic resin, said inner sheets having both sides coated with an adhesive material, enclosing the sandwich within two outer sheets of acrylic resin said outer sheets having their inner sides coated with adhesive material, placing a sheet of glass on each side of said outer sheets to form an assembly, enclosing the assembly in a plastic bag, evacuating the air from the bag, retaining the evacuated bag at room temperature for a time sufficient to remove the air from between plastic sheets, putting the bag and contents in a hot water bath to form a laminated unit, removing the laminated unit from the bag, and hanging the said laminated unit in an oven heated to a temperature of 240 to 250° F. to remove wrinkles.

References Cited in the file of this patent

UNITED STATES PATENTS

| | | |
|---|---|---|
| 2,317,276 | Knight | Apr. 20, 1943 |
| 2,464,540 | Williams | Mar. 15, 1949 |
| 2,673,822 | Dennison et al. | Mar. 30, 1954 |
| 2,697,053 | Stamatoff | Dec. 14, 1954 |